United States Patent
Neff et al.

(10) Patent No.: US 9,670,307 B2
(45) Date of Patent: Jun. 6, 2017

(54) POLYURETHANE ARTICLE WITH INCREASED COMFORT

(75) Inventors: Raymond A. Neff, Northville, MI (US); Jon P. Pavlinac, South Lyon, MI (US); Mark J. Hughes, Newport, MI (US); Berend Eling, Lemfoerde (DE); Juergen Mertes, Ludwigshafen (DE); Stephan Goettke, Vechta (DE)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 12/758,656

(22) Filed: Apr. 12, 2010

(65) Prior Publication Data

US 2010/0196690 A1 Aug. 5, 2010

Related U.S. Application Data

(62) Division of application No. 11/773,576, filed on Jul. 5, 2007, now abandoned.

(51) Int. Cl.
*C08G 18/48* (2006.01)
*C08G 18/10* (2006.01)
(Continued)

(52) U.S. Cl.
CPC ......... *C08G 18/4841* (2013.01); *C08G 18/10* (2013.01); *C08G 18/4072* (2013.01);
(Continued)

(58) Field of Classification Search
CPC C08G 18/4841; C08G 18/10; C08G 18/4072; C08G 18/4837; C08G 18/632; C08G 18/7664; C08G 18/7671
(Continued)

(56) References Cited

U.S. PATENT DOCUMENTS 4,205,136 A 5/1980 Ohashi et al.
5,521,226 A 5/1996 Bleys
(Continued)

FOREIGN PATENT DOCUMENTS

EP 0547765 A1 6/1993
EP 0547765 B1 6/1993
(Continued)

OTHER PUBLICATIONS

Publication: State of California, Technical Bulletin No. 117, "Requirements, Test Procedure and Apparatus for Testing the Flame Retardance of Resilient Filling Materials Used in Upholstered Furniture", Mar. 2000, 8 pages.
(Continued)

*Primary Examiner* — Michael L Leonard
(74) *Attorney, Agent, or Firm* — Howard & Howard Attorneys PLLC

(57) ABSTRACT

A unique combination of a hydrophilic polyol (A) and a hydrophobic polyol (B) having a terminal ethylene oxide cap are used in a resin composition and a polyurethane system, and are used to form a polyurethane article, such as a polyurethane foam. The hydrophilic polyol (A) is ethylene oxide (EO) rich and the hydrophobic polyol (B) is propylene oxide (PO) rich. The hydrophilic polyol (A) and the hydrophobic polyol (B) are present in the resin composition and the polyurethane system in a weight ratio (A:B) of from 1.5:1 to 20:1. The polyurethane article exhibits excellent comfort for use in vehicle applications, such as automotive and motorcycle seating, due to reduced resonance frequency and reduced peak vibration transmissivity relative to previous polyurethane articles.

5 Claims, 3 Drawing Sheets

(51) Int. Cl.
*C08G 18/40* (2006.01)
*C08G 18/63* (2006.01)
*C08G 18/76* (2006.01)
*C08G 101/00* (2006.01)

(52) U.S. Cl.
CPC ....... *C08G 18/4837* (2013.01); *C08G 18/632* (2013.01); *C08G 18/7664* (2013.01); *C08G 18/7671* (2013.01); *C08G 2101/0008* (2013.01); *C08G 2101/0058* (2013.01); *C08G 2101/0083* (2013.01); *C08G 2350/00* (2013.01)

(58) Field of Classification Search
USPC .......... 528/48, 76, 77, 75, 85; 521/137, 140, 521/155, 170, 173, 174, 905, 914
See application file for complete search history.

(56) References Cited

U.S. PATENT DOCUMENTS

| | | | |
|---|---|---|---|
| 5,538,779 A * | 7/1996 | Mispreuve et al. | 428/220 |
| 5,594,097 A | 1/1997 | Chaffanjon et al. | |
| 5,648,559 A * | 7/1997 | Hager | 568/620 |
| 5,677,361 A * | 10/1997 | Treboux et al. | 521/137 |
| 5,698,609 A | 12/1997 | Lockwood et al. | |
| 5,877,227 A | 3/1999 | Murty | |
| 6,063,825 A | 5/2000 | Isobe et al. | |
| 6,158,815 A | 12/2000 | Sugie et al. | |
| 6,352,658 B1 | 3/2002 | Chang et al. | |
| 6,432,543 B2 * | 8/2002 | Harrison et al. | 428/423.1 |
| 6,457,777 B1 * | 10/2002 | Kazuno et al. | 297/452.48 |
| 6,583,192 B2 | 6/2003 | Falke et al. | |
| 6,590,008 B1 * | 7/2003 | Parfondry et al. | 521/174 |
| 6,649,107 B2 | 11/2003 | Harrison et al. | |
| 6,660,783 B2 | 12/2003 | Arlt et al. | |
| 6,747,068 B2 | 6/2004 | Kelly | |
| 6,759,448 B2 | 7/2004 | Toyota et al. | |
| 6,765,034 B2 | 7/2004 | Nishida et al. | |
| 6,797,736 B1 | 9/2004 | Smiecinski et al. | |
| 6,852,403 B2 | 2/2005 | Harrison et al. | |
| 6,858,655 B1 | 2/2005 | Hofmann et al. | |
| 6,884,825 B2 * | 4/2005 | Daunch et al. | 521/174 |
| 7,238,730 B2 | 7/2007 | Apichatachutapan et al. | |
| 7,456,229 B2 | 11/2008 | Hager et al. | |
| 2001/0003757 A1 * | 6/2001 | Sakata et al. | 521/137 |
| 2003/0171445 A1 * | 9/2003 | Isobe et al. | 521/155 |
| 2005/0101681 A1 | 5/2005 | Kaushiva et al. | |
| 2007/0293594 A1 | 12/2007 | Heisler et al. | |
| 2010/0160470 A1 | 6/2010 | Smiecinski et al. | |
| 2010/0160473 A1 | 6/2010 | Neff et al. | |

FOREIGN PATENT DOCUMENTS

| | | |
|---|---|---|
| EP | 1164153 A1 | 12/2001 |
| EP | 1174453 A1 | 1/2002 |
| EP | 1178061 A1 | 2/2002 |
| EP | 1234843 A1 | 8/2002 |
| EP | 1305352 B1 | 8/2005 |
| JP | S48-80166 A | 10/1973 |
| JP | S56-067330 A | 6/1981 |
| JP | S57-203526 A | 12/1982 |
| JP | 2002-322230 A | 11/2002 |
| WO | 0008083 A1 | 2/2000 |
| WO | 0055232 A1 | 9/2000 |
| WO | 0073362 A2 | 12/2000 |
| WO | 0073363 A1 | 12/2000 |
| WO | 0107521 A1 | 2/2001 |
| WO | 0132735 A1 | 5/2001 |
| WO | 0132736 A1 | 5/2001 |
| WO | 0160884 A1 | 8/2001 |
| WO | 0210245 A1 | 2/2002 |
| WO | 0210246 A1 | 2/2002 |
| WO | 02059175 A2 | 8/2002 |
| WO | 2004014976 A1 | 2/2004 |
| WO | 2004014980 A1 | 2/2004 |
| WO | WO2005/003205 | 1/2005 |

OTHER PUBLICATIONS

Publication: Smiecinski et al., BASF Corporation, Wyandotte, Michigan, "Visco-Elastic Polyurethane Foam: The Impact of Isocyanate Upon Foam Morphology", pp. 405-416.

PCT International Search Report for PCT/US2011/025862, dated Jun. 30, 2011, 3 pages.

English language abstract and machine-assisted English translation for JP 2002-322230 extracted from the PAJ database on Aug. 9, 2013, 36 pages.

English language abstract for JP S56-067330 extracted from the PAJ database on Aug. 9, 2013, 7 pages.

English language abstract for JP S57-203526 extracted from the PAJ database on Aug. 9, 2013, 4 pages.

* cited by examiner

POLYURETHANE ARTICLE WITH INCREASED COMFORT

CROSS REFERENCE TO RELATED APPLICATION

This application is a divisional of application Ser. No. 11/773,576 filed on Jul. 5, 2007, now abandoned.

FIELD OF THE INVENTION

The present invention generally relates to a resin composition and to a polyurethane system including the resin composition, and more specifically, to a polyurethane article exhibiting increased comfort for use in vehicle applications due to the resin composition that the polyurethane article is formed from.

DESCRIPTION OF THE RELATED ART

Improvement of "comfort" in vehicle seating, such as automotive and motorcycle seating, has received attention in recent years. Global demands for improved performance from seat makers and OEMs have forced a reexamination of many aspects of seat design. This includes seats that use cushions formed from polyurethane articles, such as a polyurethane foam. In some cases, such demands are driven by the desire to reduce the thickness of the cushion to increase space and reduce weight while achieving the same performance as the original seat. Comfort has no precise definition in this regard, although it is frequently described in terms of the absence of discomfort. The body proportions and weight of a rider, as well as his or her personal preferences can influence one's perception. This leads to subjectivity and difficulty in quantifying comfort.

With respect to the comfort of a car seat cushion, Japanese Automobile Standards Organization (JASO) B-407 regulates a standard on vibration transmissibility characteristics. To obtain a comfortable feeling, it is effective to remarkably dampen the vibration in a frequency range that makes riders feel uncomfortable while being exposed to road vibrations, e.g. while riding on a motorcycle on a highway. Other sources of discomfort with respect to the seat include points of high pressure at the interface between the rider and the seat, in addition to inadequate support and/or hard feel to the seat. Tendency of polyurethane foams in the seat to creep with an applied load over time can also affect both the pressure distribution and the vibration transmissivity of the seat. Creep is defined as the reversible reduction of the cushion thickness under constant load and vibration over time, typically up to 3 hours.

Vibration performance of the seat can be improved by tuning the resonance frequency and peak transmissivity of components of the seat, such as the cushion formed from polyurethane foam. Generally, lower values for resonance frequency and peak transmissivity are favorable, as this leads to overall less vibration transmitted to the rider, and leads to vibrations over a larger range of frequencies isolated. As described above, changes in the polyurethane foam properties over time such as creep can adversely affect comfort, as the car seat will feel harder and the resonance frequency of the car seat will increase. Fatigue is the irreversible change in properties resulting from constant or cyclic loading, as measured using compression set or pounding tests. Seats must last many years in order to maintain consumer comfort and loyalty, of which fatigue properties play an important role.

Various polyurethane foams have been developed over the years for use as cushions for seats. However, these polyurethane foams suffer from one or more inadequacies, such as the use of expensive raw materials, use of a high number of components, use of hazardous components, processing and molding difficulties, undesirable comfort properties such as high resonance frequencies and high peak transmissivities, and issues with creeping and fatigue.

Accordingly, there remains an opportunity to provide a resin composition for use in forming a polyurethane article, such as a polyurethane foam, for a seat cushion that has improved comfort and performance properties including reduced peak vibration transmissivity and reduced resonance frequency. In addition, there remains an opportunity to provide a resin composition, a polyurethane system, and a polyurethane article that overcomes the remaining inadequacies described above.

SUMMARY OF THE INVENTION AND ADVANTAGES

The present invention provides a resin composition for use in forming a polyurethane article. The resin composition comprises a hydrophilic polyol (A) containing alkylene oxides and having a nominal functionality of at least 2, a hydroxyl number of from 20 to mg KOH/g, and at least 50 parts by weight ethylene oxide based on 100 parts by weight of the alkylene oxides. The resin composition further comprises a hydrophobic polyol (B) containing alkylene oxides and having a terminal ethylene oxide cap, a nominal functionality of at least 2, a hydroxyl number of from 20 to 100 mg KOH/g, and at least 60 parts by weight propylene oxide based on 100 parts by weight of the alkylene oxides. The hydrophilic polyol (A) and the hydrophobic polyol (B) are present in the resin composition in a weight ratio (A:B) of from 1.5:1 to 20:1. The present invention further provides a polyurethane system comprising the hydrophilic polyol (A), the hydrophobic polyol (B), and an isocyanate component (C).

The present invention provides a unique combination of the hydrophilic polyol (A) and the hydrophobic polyol (B) used in the resin composition and the polyurethane system, and used to form the polyurethane article. The polyurethane article exhibits excellent comfort for use in vehicle applications due to the resin composition that the polyurethane article is formed from. The polyurethane article shows reduced resonance frequency and reduced peak vibration transmissivity relative to previous polyurethane articles. Other properties such as creep, hysteresis, and fatigue are also excellent.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
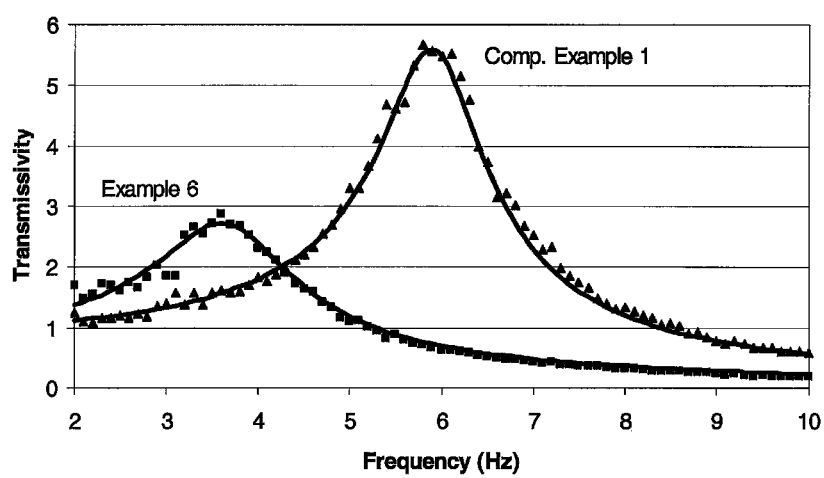
FIG. 1 is a line graph illustrating vibration transmissivity as a function of a change in frequency of Comparative (Comp.) Example 1 and Example 6 of the present invention.

The present invention provides a resin composition for use in forming a polyurethane article. The resin composition comprises a hydrophilic polyol (A). The hydrophilic polyol (A) typically has a nominal functionality of at least 2, more typically from 2 to 6, and most typically from 2 to 4. By "nominal functionality", it is meant that the functionality is based upon the functionality of an initiator molecule, rather than the actual functionality of the polyol after manufacture. The hydrophilic polyol (A) typically has a hydroxyl number of from 20 to more typically from 20 to 100, and most typically from 25 to 55, mg KOH/g. In one embodiment, the hydrophilic polyol (A) has a hydroxyl number of from about 44 to about 47 mg KOH/g.

The hydrophilic polyol (A) contains alkylene oxides. The hydrophilic polyol (A) typically has at least 50, more typically at least 70, parts by weight ethylene oxide, each based on 100 parts by weight of the alkylene oxides. Accordingly, the hydrophilic polyol (A) is an ethylene oxide rich polyol, which imparts the hydrophilic polyol (A) with hydrophilicity. In one embodiment, the hydrophilic polyol (A) is formed from the reaction of one or more types of alkylene oxides, e.g. oxyalkylene monomers such as ethylene oxide (EO) monomers, propylene oxide (PO) monomers, butylene oxide (BO) monomers, etc. It is to be appreciated that the present invention is not limited to any particular method of making the hydrophilic polyol (A).

In one embodiment, the alkylene oxides of the hydrophilic polyol (A) comprise a mixture of ethylene oxide and propylene oxide. In another embodiment, the alkylene oxides of the hydrophilic polyol (A) include only ethylene oxide. In a further embodiment, the hydrophilic polyol (A) has about 75 parts by weight ethylene oxide and about 25 parts by weight propylene oxide, each based on 100 parts by weight of the alkylene oxides. In certain embodiments, and as alluded to above, the hydrophilic polyol (A) comprises other types of alkylene oxides known in the art, e.g. butylene oxide, in combination with ethylene oxide, and optionally, in combination with propylene oxide.

The alkylene oxides of the hydrophilic polyol (A) may be arranged in various configurations, such as a random (heteric) configuration, a block configuration, a capped configuration, or a combination thereof. In one embodiment, the hydrophilic polyol (A) comprises a heteric mixture of ethylene oxide and propylene oxide. In certain embodiments, the hydrophilic polyol (A) is terminally capped, such as with an ethylene oxide cap, a propylene oxide cap, or a butylene oxide cap. If the hydrophilic polyol (A) is terminally capped, the hydrophilic polyol (A) typically has a terminal cap of from about 5 to about 25, more typically from about 5 to about 20, and most typically from about 10 to about 15, parts by weight terminal cap, e.g. ethylene oxide cap, based on 100 parts by weight of the hydrophilic polyol (A).

Suitable hydrophilic polyols (A) for purposes of the present invention include, but are not limited to, glycerine-initiated, trimethylolpropane-initiated, and sucrose-initiated polyether polyols, and combinations thereof. In one embodiment, the hydrophilic polyol (A) is a glycerine-initiated polyether polyol. The alkylene oxides of the hydrophilic polyol (A) generally extend from the respective initiator portion of the hydrophilic polyol (A), and optionally, are terminally capped, as described above. A specific example of a suitable hydrophilic polyol (A) is PLURACOL® 593 polyol, commercially available from BASF Corporation of Florham Park, N.J. In one embodiment, the hydrophilic polyol (A) has a number-average molecular weight of from 3150 to 4150. It is to be appreciated that the hydrophilic polyol (A) may include any combination of two or more of the aforementioned hydrophilic polyols. For example, the hydrophilic polyol (A) can include a first hydrophilic polyol having a nominal functionality of 2 and a second hydrophilic polyol having a nominal functionality of 3.

The resin composition further comprises a hydrophobic polyol (B) having a terminal ethylene oxide cap. The hydrophobic polyol (B) typically has a nominal functionality of at least 2, more typically from 2 to 6, and most typically from 2 to 4. The hydrophobic polyol (B) typically has a hydroxyl number of from 20 to 100 mg, more typically from 20 to 80, and most typically from 20 to 60, mg KOH/g. In one embodiment, the hydrophobic polyol (B) has a hydroxyl number of from about 23 to about 26 mg KOH/g. In another embodiment, the hydrophobic polyol (B) has a hydroxyl number of from about 34 to about 36 mg KOH/g.

The hydrophobic polyol (B) contains alkylene oxides. The hydrophobic polyol (B) typically has at least 60, more typically at least 80, parts by weight propylene oxide, each based on 100 parts by weight of the alkylene oxides. Accordingly, the hydrophobic polyol (B) is a propylene oxide rich polyol, which imparts the hydrophobic polyol (B) with hydrophobicity. In one embodiment, the hydrophobic polyol (B) is formed from the reaction of one or more types of alkylene oxides. It is to be appreciated that the present invention is not limited to any particular method of making the hydrophobic polyol (B).

In one embodiment, the alkylene oxides of the hydrophobic polyol (B) comprise a mixture of ethylene oxide and propylene oxide. In another embodiment, the alkylene oxides of the hydrophobic polyol (B) include only propylene oxide. In certain embodiments, the hydrophobic polyol (B) comprises other types of alkylene oxides known in the art, e.g. butylene oxide, in combination with propylene oxide, and optionally, in combination with ethylene oxide. The alkylene oxides of the hydrophobic polyol (B) may be arranged in various configurations, such as a random (heteric) configuration, a block configuration, a capped configuration, or a combination thereof. In one embodiment, the hydrophobic polyol (B) comprises a heteric mixture of ethylene oxide and propylene oxide.

As described above, the hydrophobic polyol (B) is terminally capped with ethylene oxide. The hydrophobic polyol (B) typically has a terminal cap of from about 5 to about 25, more typically from about 5 to about 20, and most typically from about 10 to about 15, parts by weight ethylene oxide, based on 100 parts by weight of the hydrophobic polyol (B). In one embodiment, the hydrophobic polyol (B) has about 13 parts by weight ethylene oxide cap based on 100 parts by weight of the hydrophobic polyol (B). It is to be appreciated that in certain embodiments, the ethylene oxide may only be present in the terminal ethylene oxide cap; however, in other embodiments, the ethylene oxide may also be present along with the propylene oxide, and optionally, other alkylene oxides, e.g. butylene oxide, in the alkylene oxides of the hydrophobic polyol (B).

Suitable hydrophobic polyols (B) for purposes of the present invention include, but are not limited to, glycerine-initiated, trimethylolpropane-initiated, and sucrose-initiated polyether polyols, and combinations thereof. In one embodiment, the hydrophobic polyol (B) is a glycerine-initiated polyether polyol. The alkylene oxides of the hydrophobic polyol (B) generally extend from the respective initiator portion of the hydrophobic polyol (B). In another embodiment, the hydrophilic polyol (A) and the hydrophobic polyol (B) are both glycerine-initiated polyether polyols. Specific examples of a suitable hydrophobic polyols (B) are PLURACOL® 538 and PLURACOL® 2097, both commercially available from BASF Corporation of Florham Park, N.J. In one embodiment, the hydrophobic polyol (B) has a number-average molecular weight of from about 4300 to about 5300. It is to be appreciated that the hydrophobic polyol (B) may include any combination of two or more of the aforementioned hydrophobic polyols. For example, the hydrophobic polyol (B) can include a first hydrophobic polyol having a nominal functionality of 2 and a second hydrophobic polyol having a nominal functionality of 3.

In certain embodiments, the resin composition further comprises a filler component. The filler component typically comprises the reaction product of a monomer selected from the group of styrenes, acrylonitriles, esters of acrylic and methacrylic acids, ethylenically unsaturated nitriles, amines, amides, and combinations thereof. In one embodiment, the filler component is styrene-acrylonitrile copolymer (SAN), which is the reaction product of a styrene monomer and an acrylonitrile monomer. In another embodiment, the filler component is urea, which is the reaction product of an amine monomer and an isocyanate (NCO) group, such as an NCO group of a diisocyanate. If employed in the resin composition, the filler component can be a distinct component added to the resin composition and/or can be included with at least one of the hydrophilic polyol (A) and the hydrophobic polyol (B), which is described in further detail below.

In certain embodiments, at least one of the hydrophilic polyol (A) and hydrophobic polyol (B) includes the filler component. In these embodiments, the hydrophilic polyol (A) and/or the hydrophobic polyol (B) is classified as a polymer polyol. The polymer polyol can be selected from the group of graft polyols, graft dispersion polyols, PHD (polyharnstoff dispersion) polyols, PIPA (polyisocyanate polyaddition) polyols, and combinations thereof. Graft and graft dispersion polyols are well known to those skilled in the polyurethane art and include products obtained by the in-situ polymerization, i.e., reaction, of one or more vinyl monomers, e.g. styrene monomers and/or acrylonitrile monomers, in a polyol, e.g. a polyether polyol. In one embodiment, the hydrophobic polyol (B) is a styrene-acrylonitrile graft polyol. Specific examples of suitable graft polyols include PLURACOL® 1365, PLURACOL® 4600, PLURACOL® 4800, PLURACOL® 4815, and PLURACOL® 4830, all commercially available from BASF Corporation of Florham Park, N.J. PHD polyols are typically formed by in-situ reaction of a diisocyanate with a diamine in a polyol to give a stable dispersion of polyurea particles. PIPA polyols are similar to PHD polyols, except that the dispersion is typically formed by in-situ reaction of a diisocyanate with an alkanoamine instead of a diamine, to give a polyurethane dispersion in a polyol. In certain embodiments, the hydrophobic polyol (B) includes the filler component in an amount of from about 5 to about 50, more typically from about 15 to about 40, and most typically from about 20 to about 35, parts by weight of the filler component, based on 100 parts by weight of the hydrophobic polyol (B)

and the filler component combined. In other embodiments, the hydrophilic polyol (A) includes the filler component in the amounts described above. It is to be appreciated that in certain embodiments, both the hydrophilic polyol (A) and hydrophobic polyol (B) can include the filler component. It is also to be appreciated that the present invention is not limited to any particular method of making the polymer polyol, if employed.

The hydrophilic polyol (A) and the hydrophobic polyol (B) are present in the resin composition in a weight ratio (A:B) of from 1.5:1 to 20:1, more typically from 1.5:1 to 10:1, and most typically from 1.5:1 to 6:1. If the filler component is included with the hydrophilic polyol (A) and/or the hydrophobic polyol (B), the respective polymer polyol includes the filler component and a carrier polyol portion. For purposes of the present invention, the weight ratio (A:B) described above applies to the parts by weight of the carrier polyol portion and not to the parts by weight attributed to by the filler component, if included. This concept is illustrated by the following formula:

$$\text{weight ratio } (A:B) = (A - X_A) : (B - X_B)$$

where A is equal to the combined parts by weight of the carrier polyol portion and the filler component of hydrophilic polyol (A), $X_A$ is equal to only the parts by weight of the filler component present in the hydrophilic polyol (A), B is equal to the combined parts by weight of the carrier polyol portion and the filler component of the hydrophobic polyol (B), and $X_B$ is equal to only the parts by weight of the filler component present in the hydrophobic polyol (B). For example, if the hydrophilic polyol (A) does not include the filler component and is included in the resin composition in an amount of 60 parts by weight, A=60 and $X_A$=0. Further, if the hydrophobic polyol (B) is included in the resin composition in an amount of 40 parts by weight, and the hydrophobic polyol (B) includes 25 parts by weight of the filler component and 75 parts by weight of the carrier polyol portion, based on 100 parts by weight of the hydrophobic polyol (B), B=40 and $X_B$=10). Accordingly, with exclusion of the parts by weight attributed to by the filler component, the hydrophilic polyol (A) and the hydrophobic polyol (B) are present in the resin composition in a weight ratio (A:B) of 2:1. The weight ratio (A:B) is important for controlling the total amount of ethylene oxide and propylene oxide present in the resin composition, which imparts the resin composition with hydrophilic/phobic end properties. Overall, the resin composition is considered hydrophilic, due to the excess of the hydrophilic polyol (A) relative to the hydrophobic polyol (B).

The resin composition may further comprise an additive component. If employed, the additive component is typically selected from the group of surfactants, catalysts, fillers, flame retardants, water, plasticizers, stabilizers, cross-linking agents, chain-extending agents, chain-terminating agents, air releasing agents, wetting agents, surface modifiers, waxes, foam stabilizing agents, moisture scavengers, desiccants, viscosity reducers, cell-size reducing compounds, cell openers, reinforcing agents, dyes, pigments, colorants, mold release agents, anti-oxidants, compatibility agents, ultraviolet light stabilizers, thixotropic agents, anti-aging agents, lubricants, coupling agents, solvents, rheology promoters, adhesion promoters, thickeners, smoke suppressants, anti-static agents, anti-microbial agents, and combinations thereof.

Specific examples of suitable catalysts include POLYCAT® 77, DABCO® 33LV, DABCO® BL-11, DABCO® BL-17, and DABCO® 8800, all commercially available from Air Products and Chemicals of Allentown, Pa., and NIAX® A-1, commercially available from Crompton OSi Specialties of Greenwich, Conn. Specific examples of suitable surfactants include DC-198, DC-5043, and DC-5164, all commercially available from Dow Corning Corporation of Midland, Mich., DABCO® DC-5164, commercially available from Air Products and Chemicals of Allentown, Pa., and TEGOSTAB® B4113, commercially available from Degussa Goldschmidt Chemical Corporation of Hopewell, Va. It is to be appreciated that the additive component may include any combination of the aforementioned additives.

The resin composition may further comprise a supplemental polyol in addition to the hydrophilic polyol (A) and the hydrophobic polyol (B), and optionally, the filler component and/or the additive component, if employed. The supplemental polyol may be any polyol or mixture of two or more polyols known in the polyurethane art, such as diols, triols, or mixtures thereof. A specific example of a suitable supplemental polyol is a sucrose/glycerine initiated polyol having a nominal functionality of 4 and a hydroxyl number of from about 360 to about 375 mg KOH/gm, commercially available from BASF Corporation of Florham Park, N.J.

The hydrophilic polyol (A) and the hydrophobic polyol (B) may be present in the resin composition in various amounts following the ratios described above. If at least one of the filler component, the additive component, and the supplemental polyol is employed, the hydrophilic polyol (A) and the hydrophobic polyol (B) are typically present in the resin composition in a combined amount of from about 70 to about 97, more typically from about 80 to about 90, and most typically from about 80 to about 85, parts by weight, based on 100 parts by weight of the resin composition. Accordingly, if employed in the resin composition, the filler component, the additive component, and/or the supplemental polyol, is present in the resin composition in the remaining 100 parts by weight of the resin composition, e.g. from about 3 to about 30 parts by weight based on 100 parts by weight of the resin composition. In certain embodiments, the filler component is present in the resin composition in an amount of from about 0.1 to about 30 parts by weight, based on 100 parts by weight of the resin composition. In other embodiments, the additive component is present in the resin composition in an amount of from about 0.1 to about 15 parts by weight, based on 100 parts by weight of the resin composition. In yet other embodiments, the supplemental polyol is present in the resin composition in an amount of from about 0.1 to about 15 parts by weight, based on 100 parts by weight of the resin composition. It is to be appreciated that the filler component, the additive component, and the supplemental polyol are optional components, and therefore, the hydrophilic polyol (A) and the hydrophobic polyol (B) may be present in the resin composition in a combined amount of 100 parts by weight of the resin composition.

The present invention further provides a polyurethane system for use in forming the polyurethane article. The polyurethane system comprises the hydrophilic polyol (A), the hydrophobic polyol (B), and an isocyanate component (C). The polyurethane system may further comprise at least one of the filler component, the additive component, and the supplemental polyol, as described above with description of the resin composition. The hydrophilic polyol (A) and the hydrophobic polyol (B) are present in the polyurethane system in the weight ratio (A:B) of from 1.5:1 to 20:1, more typically from 1.5:1 to 10:1, and most typically from 1.5:1 to 6:1. Overall, the polyurethane system is considered hydrophilic, due to the excess of the hydrophilic polyol (A) relative to the hydrophobic polyol (B). As previously described and illustrated above, the weight ratio (A:B) does not apply to any parts by weight attributed to by the filler component, if included with the hydrophilic polyol (A) and/or the hydrophobic polyol (B).

The polyurethane system may be supplied to consumers for use by various means, such as in large sized drums and containers or smaller sized kits and packets. For example, one kit can contain the resin composition and another kit can contain the isocyanate component (C). It is to be appreciated that the hydrophilic polyol (A) and the hydrophobic polyol (B) may or may not already be combined to form the resin composition, i.e., the polyurethane system may comprise two, three, or more distinct components, such as individual kits each including distinct components.

In one embodiment, the isocyanate component (C) is an organic polyisocyanate. Suitable organic polyisocyanates include, but are not limited to, conventional aliphatic, cycloaliphatic, araliphatic and aromatic isocyanates. In one embodiment, the isocyanate component (C) is selected from the group of diphenylmethane diisocyanates (MDIs), polymeric diphenylmethane diisocyanates (pMDIs), and combinations thereof. Examples of other suitable isocyanates for purposes of the present invention include toluene diisocyanates (TDIs), hexamethylene diisocyanates (BDIs), isophorone diisocyanates (IPDIs), and combinations thereof. Specific examples of suitable isocyanate components (C) include LUPRANATE® M, LUPRANATE® ME, LUPRANATE® MI, and LUPRANATE® M20S, all commercially available from BASF Corporation of Florham Park, N.J.

In another embodiment, the isocyanate component (C) is an isocyanate-terminated prepolymer. The isocyanate-terminated prepolymer is a reaction product of an isocyanate and an isocyanate-reactive component. The isocyanate may be any type of isocyanate known to those skilled in the art, such as one of the organic polyisocyanates described above. The isocyanate-reactive component may be a polyol selected from at least one of ethylene glycol, diethylene glycol, propylene glycol, dipropylene glycol, butane diol, glycerol, trimethylolpropane, triethanolamine, pentaerythritol and sorbitol. The isocyanate-reactive component may be a polyamine selected from, but not limited to, ethylene diamine, toluene diamine, diaminodiphenylmethane and polymethylene polyphenylene polyamines, and aminoalcohols. Examples of suitable aminoalcohols include ethanolamine and diethanolamine, triethanolamine, and combinations thereof. In one embodiment, the isocyanate-reactive component is a polyol having a number-average molecular weight greater than 1,000 and is present in an amount of from 1 to 20 parts by weight based on 100 parts of the isocyanate component (C). It is to be appreciated that the isocyanate component (C) may include any combination of the aforementioned isocyanates and isocyanate-terminated prepolymers. In addition, the present invention is not limited to any particular method of making the isocyanate component (C).

The present invention yet further provides a polyurethane article. The polyurethane article comprises the reaction product of the polyurethane system, i.e., the hydrophilic polyol (A), the hydrophobic polyol (B), and the isocyanate component (C), in the presence of a blowing agent component (D). The polyurethane article may further comprise the reaction product of the supplemental polyol, and/or include at least one of the filler component and the additive component, as described above with description of the resin composition.

The hydrophilic polyol (A) and the hydrophobic polyol (B) are present in a weight ratio (A:B) of from 1.5:1 to 20:1, more typically from 1.5:1 to 10:1, and most typically from 1.5:1 to 6:1, prior to reaction of the polyurethane system to make the polyurethane article. Accordingly, the polyurethane article is a hydrophilic polyurethane foam. In addition, the polyurethane article is typically classified as a viscoelastic polyurethane foam. As previously described and illustrated above, the weight ratio (A:B) does not apply to any parts by weight attributed to by the filler component, if included with the hydrophilic polyol (A) and/or the hydrophobic polyol (B), prior to reaction to make the polyurethane article.

An isocyanate index, as is known in the polyurethane art, is a ratio of NCO groups in the isocyanate component (C) to OH groups in the hydrophilic polyol (A) and the hydrophobic polyol (B) combined. The isocyanate component (C), the hydrophilic polyol (A), and the hydrophobic polyol (B), and optionally, the supplemental polyol, are typically reacted in an amount to have an isocyanate index of from about 90 to about 120, more typically from about 95 to about 115, and most typically from about 100 to about 115, to make the polyurethane article. The isocyanate index can be adjusted in order to change hardness of the polyurethane article. For example, to make the polyurethane article harder, the isocyanate index can be increased from 110 to 115. If present in the polyurethane article, the filler component, e.g. SAN, can also increase hardness of the polyurethane article, and can also increase tear strength of the polyurethane article. One skilled in the polyurethane art appreciates that the amount of isocyanate component (C) present prior to reaction to make the polyurethane article can be determined by the isocyanate index in combination with the combined amount of the hydrophilic polyol (A) and the hydrophobic polyol (B), and optionally, the supplemental polyol, present prior to reaction to make the polyurethane article.

The blowing agent component (D) may be any blowing agent known in the art. For example, the blowing agent component (D) may be selected from the group of chemical blowing agents, physical blowing agents, and combinations thereof. In one embodiment, the blowing agent component (D) is a chemical blowing agent. As known to those skilled in the art, chemical blowing agents react with one or more of the components employed to make the polyurethane article, such as the isocyanate component (C) to produce a gas, e.g. carbon dioxide, which physically foams the polyurethane article while forming. If employed as the blowing agent component (D), the chemical blowing agent is typically water, which reacts with the isocyanate component (C) to produce carbon dioxide gas. In another embodiment, the blowing agent component (D) is a physical blowing agent. As used herein, physical blowing agents are blowing agents that retain their original chemical structure throughout a blowing process, i.e., the physical blowing agent does not react with any of the components employed to make the polyurethane article. If employed as the blowing agent component (D), the physical blowing agent is typically a hydrofluorocarbon (HFC) due to nonflammability and zero ozone depletion potential. Examples of suitable physical blowing agents for purposes of the present invention include HFC-134a, HFC-152a, HFC-245fa, HFC-365mfc, HFC-22, and combinations thereof.

It is to be appreciated that some or all of the blowing agent component (D) may already be present in one of the components of the present invention. For example, the resin composition may include water as the additive component, which serves as the blowing agent component (D). In certain embodiments, the blowing agent component (D) is water and is included in an amount of from about 0.5 to about 5 parts by weight based on 100 parts by weight of the hydrophilic polyol (A) and the hydrophobic polyol (B) combined, prior to reaction to make the polyurethane article.

The polyurethane articles of the present invention can be used for various applications, and are especially suitable for use in seating applications. For example, the polyurethane article can be molded in a seat cushion mold to form a seat cushion, e.g. a car seat cushion, a truck seat cushion, a heavy truck seat cushion, a motorcycle seat cushion, a bike seat cushion, a tractor seat cushion, an ATV seat cushion, a boat seat cushion, a jet-ski seat cushion, a snowmobile seat cushion, etc. The seat cushion mold may be any seat cushion mold known in the molding and forming art, such as a closed-type or an open-type mold. If employed, the seat cushion mold is typically heated, to promote curing of the polyurethane article. Suitable temperatures for curing the polyurethane article typically range from 100° F. to 130° F.; however, it is to be appreciated that lower or higher temperatures may also be used to cure, such as room temperature. In other words, the seat cushion mold may be unheated.

In one embodiment, the polyurethane article is in combination with an outer layer in contact with the polyurethane article, which generally enables the use of a thinner and/or softer seat cushion formed from the polyurethane article of the present invention. If employed, the outer layer is typically an elastomeric layer, which typically comprises the reaction product of a sprayable elastomer composition. Suitable polyurethane elastomer compositions for purposes of the present invention are disclosed in U.S. Pat. No. 6,432,543 to Harrison et al., U.S. Pat. No. 6,649,107 to Harrison et al., U.S. Pat. No. 6,852,403 to Harrison et al., and U.S. Pat. No. 6,352,658 to Chang et al., the disclosures of which are incorporated herein by reference in their entirety. Examples of other suitable outer layers for purposes of the present invention include, but are not limited to, vinyl, cloth, leather, and combinations thereof.

As alluded to above, the polyurethane article can be configured to have various desired end properties such as a hardness, e.g. a 25% IFD (indentation force deflection) of about 70 pound force (lbf), and/or a density, e.g. about a density of about 5 pounds per cubic foot (lbs/ft$^3$). In one embodiment, the polyurethane article has a hardness, specifically a 25% IFD, of about 75 pound force (lbf). The polyurethane article typically has a 25% IFD of from about 30 to about 100, more typically from about 40 to about 80, and most typically from about 50 to about 80, lbf. The polyurethane article typically has excellent fatigue properties, typically the polyurethane article has a 40% IFD change of less than about 8, more typically, less than about 5, and most typically less than about 3, percent loss. In one embodiment, the polyurethane article has a density of less than 10 lbs/ft$^3$. The polyurethane article typically has a density of from about 1 to about 10, more typically from about 3 to 7, and most typically from about 4 to about 6, lbs/ft$^3$. Hardness, fatigue, and density of the polyurethane articles can be determined according to ASTM D 3574. Other physical properties of the polyurethane articles, such as hysteresis, can be better appreciated by reference to the examples described below.

Generally, two important physical properties of the polyurethane articles relate to vibration transmissivity, specifically peak vibration transmissivity and resonance frequency. These vibration transmissivity properties are usually important when the polyurethane article is used for making seat cushions, as previously described above. Generally, a lower resonance frequency and peak vibration transmissivity are desired, because less vibration is transmitted to a rider using the seat cushion. In one embodiment, the polyurethane article has a peak vibration transmissivity less than 3. In certain embodiments, the polyurethane article has a thickness of about 4 inches and a peak vibration transmissivity less than 3. It is to be appreciated that the polyurethane article may be configured to have various thicknesses that are thicker or thinner than 4 inches. The aforementioned embodiments are generally important for meeting certain comfort requirements for automobile seating as generally dictated, for example, by JASO B-407. In addition to peak vibration transmissivity and resonance frequency, dynamic modulus is generally important for determining creep characteristics of the polyurethane article.

There is a link between dynamic modulus and vibration transmissivity of the polyurethane articles. The resonance frequency generally increases with the square root of the dynamic modulus, as illustrated by the following formula:

$$\omega_0 = \sqrt{\frac{E \cdot A}{d \cdot m}}$$

where $\omega_0$ is the resonance frequency (in rad/s), E is the dynamic modulus, A is the cross sectional area covered by a mass, d is a compressed thickness of the polyurethane article and m is the mass. The dynamic modulus is a slope of a force deflection curve, i.e., it is the amount of additional force required to further deflect the polyurethane article. Generally, a lower dynamic modulus value is more desirable, since it leads to a lower resonance frequency of the polyurethane article in addition to less pressure felt by a rider when exposed to vibrations such as when riding in a vehicle. As described above, the polyurethane article may be of various thicknesses, such as those typically used in seating applications, e.g. about 1 to about 4 inches in thickness.

The following examples, illustrating the resin compositions, polyurethane systems, and polyurethane articles of the present invention, are intended to illustrate and not to limit the invention.

EXAMPLES

Six examples, specifically Examples 1-6, of the polyurethane article of the present invention are prepared. In addition, two control polyurethane articles, specifically Comparative (Comp.) Examples 1 and 2, are prepared for comparison with Examples 1-6. The polyurethane articles are prepared using standard hand-mix techniques. All of the components, except for Isocyanate 1, are blended using a 3-inch diameter mix blade for 45 seconds at 3000 rpm to form a resin composition. Isocyanate 1 is then added to the resin composition to form a foam mixture, which is then mixed for an additional 6 seconds. The foam mixture is then poured into a water jacketed electrically-heated 15×15×4 inch rectangular block mold and a surface temperature of the block mold is maintained at 120° F. to form blocks of the polyurethane articles. Configuration of the block mold requires application of a solvent-based mold release agent and an open mold pour. The polyurethane articles are de-molded after 7 minutes and are immediately crushed by hand. The amount and type of each component used to form the polyurethane articles is indicated in Table 1 below with all values in parts by weight based on 100 parts by weight of all of the components prior to reaction to make the polyurethane article unless otherwise indicated.

TABLE 1

| Component | Comp. 1 | Comp. 2 | Example 1 | Example 2 | Example 3 | Example 4 | Example 5 | Example 6 |
|---|---|---|---|---|---|---|---|---|
| Polyol 1 | 97.52 | — | — | — | — | — | — | — |
| Polyol 2 | — | 77.00 | 77.00 | 77.00 | 59.00 | 77.00 | 59.00 | 68.00 |
| Polyol 3 | — | — | — | 18.00 | 36.00 | 18.00 | 36.00 | 27.00 |
| Polyol 4 | — | 2.00 | 18.00 | — | — | — | — | — |
| Polyol 5 | — | 16.00 | — | — | — | — | — | — |
| Catalyst 1 | 0.165 | — | — | — | — | — | — | — |
| Catalyst 2 | 0.165 | — | — | — | — | — | — | — |
| Catalyst 3 | — | 0.15 | 0.15 | 0.15 | 0.15 | 0.15 | 0.15 | 0.15 |
| Catalyst 4 | — | 0.40 | 0.40 | 0.40 | 0.40 | 0.40 | 0.40 | 0.40 |
| Surfactant 1 | 0.50 | — | — | — | — | — | — | — |
| Surfactant 2 | — | 1.00 | 1.00 | 1.00 | — | 1.00 | — | — |
| Surfactant 3 | — | — | — | — | 1.00 | — | 1.00 | 1.00 |
| Water | 1.65 | 1.65 | 1.65 | 1.65 | 1.65 | 1.65 | 1.65 | 1.65 |
| Isocyanate 1 | 29.68 | 32.45 | 31.72 | 31.30 | 30.44 | 34.59 | 33.65 | 32.49 |
| Isocyanate Index | 100 | 95 | 95 | 95 | 95 | 105 | 105 | 100 |

Polyol 1 is a high molecular weight polyol having about 21 wt % ethylene oxide, a nominal functionality of 3 and a hydroxyl number of from 26.5 to 28.5 mg KOH/gm, commercially available from BASF Corporation of Florham Park, N.J.

Polyol 2 is an ethylene oxide rich hydrophilic polyol having about 75 wt % ethylene oxide, a nominal functionality of 3, a hydroxyl number of from 44.0 to 47.0 mg KOH/gm, and a number-average molecular weight of about 3650, commercially available from BASF Corporation of Florham Park, N.J.

Polyol 3 is a propylene oxide rich hydrophobic graft polyol comprising a carrier polyol having a terminal ethylene oxide cap of about 13 wt % and having about 32% SAN solids, a nominal functionality of 3, and a hydroxyl number of from 23 to 26 mg KOH/gm, commercially available from BASF Corporation of Florham Park, N.J.

Polyol 4 is a high molecular weight polyol having a terminal ethylene oxide cap of about 13 wt %, a nominal functionality of 3, a hydroxyl number of from 34.0 to 36.0 mg KOH/gm, and a number-average molecular weight of about 4800, commercially available from BASF Corporation of Florham Park, N.J.

Polyol 5 is a hydroxyl terminated polypropylene glycol having a number-average molecular weight of about 2000, commercially from BASF Corporation of Florham Park, N.J.

Catalyst 1 is a tertiary amine catalyst comprising bis-(dimethylaminopropyl)methylamine, commercially available from Air Products and Chemicals of Allentown, Pa.

Catalyst 2 is an amine blowing catalyst comprising bis-(2-dimethylamino ethyl)ether, commercially available from Air Products and Chemicals of Allentown, Pa.

Catalyst 3 is an amine blowing catalyst comprising about 70 wt % bis-(2-dimethylaminoethyl)ether and about 30 wt % dipropylene glycol, commercially available from Air Products and Chemicals of Allentown, Pa.

Catalyst 4 is a gelling catalyst comprising about 33 wt % triethylenediamine and about 67 wt % dipropylene glycol, commercially available from Air Products and Chemicals of Allentown, Pa.

Surfactant 1 is a cell-regulating silicone surfactant, commercially available from Degussa Goldschmidt Chemical Corporation of Hopewell, Va.

Surfactant 2 is a nonionic silicone glycol surfactant, commercially available from Dow Corning Corporation of Midland, Mich.

Surfactant 3 is a silicone surfactant, commercially available from Dow Corning Corporation of Midland, Mich.

Isocyanate 1 is a blend of three isocyanates comprising:

1) about 36 wt % of polymethylene polyphenylpolyisocyanate having a functionality of about 2.7 and an NCO content of about 31.5 wt %;

2) about 33.0 wt % of an essentially pure 4,4'-diphenylmethane diisocyanate having a functionality of about 2.0 and an NCO content of about 33.5 wt %; and 3) about 31 wt % of a mixture of about 50 wt % of 2,4'-diphenylmethane diisocyanate and about 50 wt % of 4,4'-diphenylmethane diisocyanate, the mixture having a functionality of about 2 and an NCO content of about 33.5 wt %;

all commercially available from BASF Corporation of Florham Park, N.J.

Various physical properties of the polyurethane articles are tested. For example, IFD, tensile strength, falling ball resilience, and heat aging, density, block tear, air flow, and compression sets, etc., are measured in accordance with ASTM D 3574. Vibration transmissivity is conducted on the polyurethane articles using a testing apparatus. The testing apparatus includes a shaker, a table above the shaker, accelerometers, and a mass above the table. The mass is an 8-inch diameter disk weighing 50 lbs. The block of the polyurethane article is placed on the shaker between the table and the mass. Accelerometers are placed on the table and the mass. After loading the polyurethane article, the mass is allowed to rest on the polyurethane article for 30 seconds. A sinusoidal waveform is then applied to the table, and frequencies between 1 and 10 Hz are scanned within 150 seconds, recording data every 0.1 Hz. Peak acceleration at the table is controlled at a constant 0.2 g. Data is recorded as a ratio of acceleration at the mass to acceleration at the table. Digital filtering is employed to reduce noise in the data.

DMA (Dynamic Mechanical Analysis) is performed in accordance with ASTM D 4065, using a Rheometrics RSA III and disk-shaped DMA samples of the polyurethane articles. The DMA samples have a diameter of 25 mm and a height of 13 mm. Data is collected using a temperature sweep between −100° C. and +200° C., a heating rate of 5° C./min, a frequency of 1 Hz and a strain amplitude of 0.2%.

Figure 2:
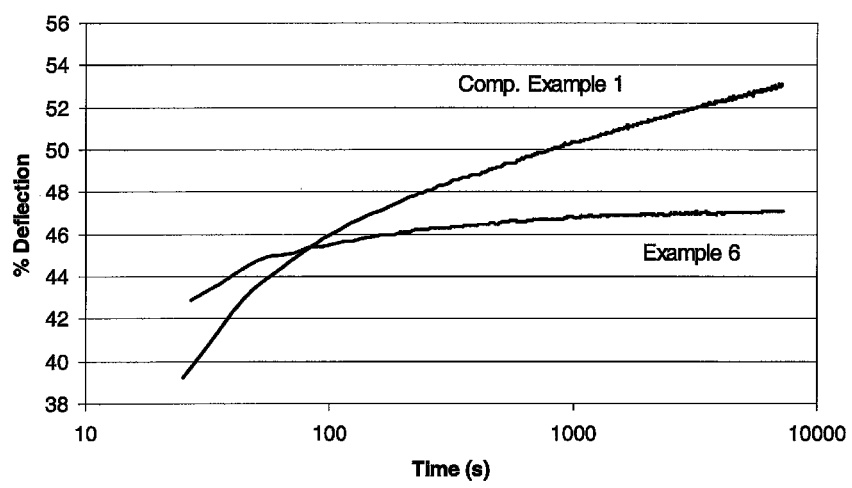
FIG. 2 is a line graph illustrating percent deflection as a function of a change in time of Comp. Example 1 and Example 6 of the present invention.
Figure 3:
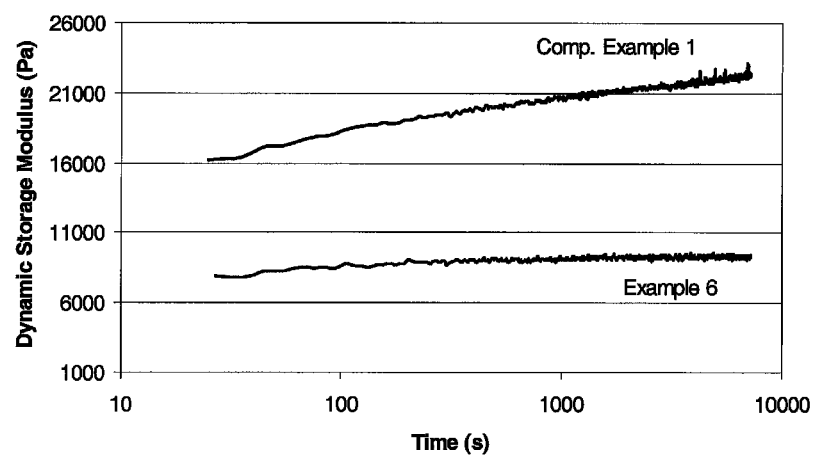
FIG. 3 is a line graph illustrating dynamic creep, specifically DMA (dynamic storage modulus) as a function of a change in time of Comp. Example 1 and Example 6 of the present invention.

Dynamic Creep analysis is performed using the Rheometrics RSA III and disk-shaped creep samples of polyurethane articles. The creep samples have a diameter of 25 mm and a height of 25 mm. Force required for compressing the creep samples 40% of the original height (25 mm) is measured using the Rheometrics RSA III, and the samples are allowed to relax for 24 hours. The creep samples are then loaded into the Rheometrics RSA III, and statically compressed to the predetermined force. An oscillatory strain with amplitude of 1 mm and a frequency of 1 Hz is applied to the creep sample. An auto-tension feature is used to maintain a static force constant at the value originally measured, resulting in a steady decrease of thickness of the creep sample due to creep. Dynamic modulus and sample thickness of the samples are recorded for two hours. Various physical properties of the examples are shown below in Table 2. Vibration transmissivity and percent deflection of Comp. Example 1 and Example 6 are also illustrated in FIGS. 1, 2 and 3, wherein Example 6 shows dramatic improvements relative to Comp. Example 1.

TABLE 2

| | Example | | | | | | | |
|---|---|---|---|---|---|---|---|---|
| | Comp. 1 | Comp. 2 | 1 | 2 | 3 | 4 | 5 | 6 |
| Mechanical Properties | | | | | | | | |
| Core Density (lbs/ft³) | 5.00 | 4.90 | 5.03 | 4.81 | 5.07 | 4.84 | 4.91 | 5.04 |
| Original 25% IFD (lbf) | 73.18 | 32.73 | 48.70 | 61.55 | 61.05 | 69.40 | 70.25 | 65.00 |
| Original 25% R IFD (lbf) | 61.98 | 32.05 | 46.11 | 59.12 | 58.01 | 66.54 | 66.58 | 62.45 |
| Original 65% IFD (lbf) | 184.01 | 80.42 | 99.06 | 131.24 | 138.02 | 146.47 | 160.75 | 148.60 |
| SAG Factor | 2.51 | 2.46 | 2.03 | 2.13 | 2.26 | 2.11 | 2.29 | 2.29 |
| Recovery (%) | 84.70 | 97.92 | 94.68 | 96.05 | 95.02 | 95.88 | 94.78 | 96.08 |
| Hysteresis (%) | 24.60 | 6.00 | 9.70 | 9.30 | 11.60 | 9.40 | 11.60 | 8.90 |
| Air Flow (cfm) | 1.25 | 6.00 | 0.41 | 0.17 | 0.17 | 0.18 | 7.14 | 0.62 |
| Block Tear (ppi) | 1.65 | 1.20 | 0.45 | 0.42 | 0.80 | 0.56 | 0.91 | 0.65 |
| Break Elongation (%) | 75.73 | 105.87 | 41.70 | 42.87 | 60.97 | 39.17 | 59.53 | 48.70 |
| Tensile Strength (psi) | 12.66 | 10.18 | 4.73 | 6.77 | 11.26 | 7.21 | 12.47 | 10.03 |
| Original 50% CFD (psi) | 1.45 | 0.59 | 0.80 | 1.04 | 1.06 | 1.20 | 1.24 | 1.19 |
| Humid Aged (3 hrs 220° F.) CFD % of Original (%) | 82.09 | 62.52 | 62.11 | 66.86 | 67.90 | 69.04 | 70.85 | 71.32 |
| Comp Set 50% Ambient (%) | 2.82 | 0.68 | 1.07 | 0.92 | 1.50 | 0.79 | 0.94 | 0.86 |
| Comp Set 90% Ambient (%) | 2.63 | 0.36 | −0.61 | 1.13 | 1.57 | 1.23 | 1.62 | −0.05 |
| Core Resilience (%) | 63 | 62 | 43 | 41 | 34 | 37 | 39 | 60 |

TABLE 2-continued

|  | Example | | | | | | | |
| --- | --- | --- | --- | --- | --- | --- | --- | --- |
|  | Comp. 1 | Comp. 2 | 1 | 2 | 3 | 4 | 5 | 6 |
| Pounding Fatigue | | | | | | | | |
| % Thickness Loss | 1.06 | 0.58 | 0.63 | 0.92 | 0.63 | 0.92 | 0.77 | 0.77 |
| 40% IFD (% Loss) | 8.70 | 2.16 | 4.22 | 2.74 | 5.73 | 2.45 | 2.42 | 2.57 |
| Vibration Transmissivity | | | | | | | | |
| Resonance Frequency (Hz) | 7.54 | 3.05 | 3.37 | 5.25 | 5.53 | 6.41 | 5.07 | 3.73 |
| Peak Transmissivity | 6.21 | 2.92 | 2.13 | 1.55 | 1.53 | 2.41 | 2.95 | 2.67 |
| DMA | | | | | | | | |
| Peak Tan Delta | 0.87 | 0.71 | 0.78 | 0.74 | 0.53 | 0.72 | 0.55 | 0.65 |
| Tg (° C.) | −50.5 | −14.7 | −17.6 | −19.6 | −7.6 | −17.8 | −10.1 | −15.9 |

All of the Examples 1-6 perform well in both the dynamic creep and vibration tests relative to Comp. Example 1. Peak transmissivity is consistently less than the Comp. Example 1, and the resonance frequency is better than Comp. Example 1. Hardness for all of the Examples 1-6 is consistently higher than Comp. Example 2. Fatigue is reduced for all of the Examples 1-6 relative to Comp. Example 1. Example 6 shows the best combination of hardness and performance in the vibration transmissivity testing.

Three additional examples, specifically Examples 7-9, of the polyurethane article of the present invention are prepared. In addition, one control polyurethane article, specifically Comp. Example 3, is prepared for comparison with the Examples 7-9. The foam mixtures are dispensed through an EMB high-pressure urethane metering machine. Total output of the foam mixture is maintained at a rate of 250 g/s. Resin and isocyanate component temperatures are both maintained at 80° F. The surface temperature of the block mold is maintained at 120° F. to form blocks of the polyurethane articles. The polyurethane articles are de-molded after about 3 minutes. Immediately upon de-molding, the polyurethane articles are crushed by hand. The amount and type of each component used to form the polyurethane articles is indicated in Table 3 below with all values in parts by weight based on 100 parts by weight of all of the components prior to reaction to make the polyurethane article unless otherwise indicated.

TABLE 3

|  | Example | | | |
| --- | --- | --- | --- | --- |
| Component | Comp. 3 | 7 | 8 | 9 |
| Polyol 1 | 97.52 | — | — | — |
| Polyol 2 | — | 68.00 | 68.00 | 68.00 |
| Polyol 3 | — | 27.00 | 27.00 | 27.00 |
| Catalyst 1 | 0.165 | — | — | — |
| Catalyst 2 | 0.165 | — | — | — |
| Catalyst 3 | — | 0.15 | 0.15 | 0.15 |
| Catalyst 4 | — | 0.40 | 0.40 | 0.40 |
| Surfactant 1 | 0.50 | — | — | — |
| Surfactant 3 | — | 1.00 | 1.00 | 1.00 |
| Water | 1.65 | 1.65 | 1.65 | 1.65 |
| Isocyanate 1 | 29.68 | 32.49 | 35.80 | 37.40 |

Various physical properties of the polyurethane articles are tested as described above with Examples 1-6 and illustrated in Table 4 below. Peak transmissivity is consistently less for Examples 7-9 relative to Comp. Example 3.

TABLE 4

|  | Example | | | |
| --- | --- | --- | --- | --- |
|  | Comp. 3 | 7 | 8 | 9 |
| Mechanical Properties | | | | |
| Core Density (lbs/ft$^3$) | 4.93 | 5.12 | 5.07 | 5.05 |
| Original 25% IFD (lbf) | 75.16 | 54.23 | 65.44 | 73.41 |
| Original 25% R IFD (lbf) | 62.80 | 51.85 | 62.67 | 69.94 |
| Original 65% IFD (lbf) | 206.85 | 119.55 | 146.37 | 160.22 |
| SAG Factor | 2.75 | 2.20 | 2.24 | 2.18 |
| Recovery (%) | 83.56 | 95.61 | 95.77 | 95.27 |
| Hysteresis (%) | 26.90 | 10.40 | 10.20 | 11.20 |
| Air Flow (cfm) | 0.53 | 0.12 | 0.23 | 0.18 |
| Block Tear (ppi) | 1.39 | 0.66 | 0.79 | 0.93 |
| Break Elongation (%) | 72.13 | 57.37 | 60.00 | 58.13 |
| Tensile Strength (psi) | 20.00 | 9.79 | 12.55 | 13.20 |
| Original 50% CFD (psi) | 1.43 | 0.99 | 1.17 | 1.37 |
| Humid Aged (3 hrs 220° F.) | 88.68 | 75.38 | 78.79 | 79.08 |
| CFD % of Original (%) | | | | |
| Comp Set 50% Ambient | 2.96 | 1.93 | 2.67 | 2.12 |
| Humid Aged (3 hrs 220° F.) | — | 1.39 | 0.15 | 0.65 |
| 50% Compr. Set (%) | | | | |
| Core Resilience (%) | 52.00 | 28.00 | 32.00 | 38.00 |
| Vibration Transmissivity | | | | |
| Resonance Frequency (Hz) | 6.90 | 6.60 | 5.20 | 5.70 |
| Peak Transmissivity | 5.40 | 1.90 | 1.80 | 2.20 |
| DMA | | | | |
| Peak Tan Delta | 0.79 | 0.59 | 0.55 | 0.49 |
| Tg (° C.) | −49.00 | −12.03 | −9.78 | −6.52 |

One additional example, specifically Example 10, of the polyurethane article of the present invention is prepared. In addition, one control polyurethane article, specifically Comp. Example 4, is prepared for comparison with Example 10. The polyurethane articles are made like the polyurethane articles described above with Examples 1-6.

The amount and type of each component used to form the polyurethane articles is indicated in Table 5 below with all values in parts by weight based on 100 parts by weight of all of the components prior to reaction to make the polyurethane article unless otherwise indicated.

TABLE 5

|  | Example | |
| --- | --- | --- |
| Component | Comp. 4 | 10 |
| Polyol 6 | — | 69.10 |
| Polyol 7 | 91.60 | — |
| Polyol 8 | — | 30.90 |
| Polyol 9 | 3.50 | — |

TABLE 5-continued

| | Example | |
|---|---|---|
| Component | Comp. 4 | 10 |
| Polyol 10 | 0.60 | — |
| Catalyst 3 | 0.05 | — |
| Catalyst 4 | 0.60 | 0.25 |
| Catalyst 5 | — | 0.54 |
| Catalyst 6 | 0.40 | — |
| Catalyst 7 | 0.50 | — |
| Surfactant 1 | 0.30 | — |
| Surfactant 2 | — | 0.50 |
| Water | 2.45 | 2.20 |
| Isocyanate 2 | 54 | — |
| Isocyanate 3 | — | 50.8 |
| Isocyanate Index | 100 | 100 |

Polyol 6 is an ethylene oxide rich hydrophilic polyol having a terminal ethylene oxide cap of about 5 wt % and about 75 total wt % ethylene oxide, a nominal functionality of 3, and a hydroxyl number of about 41.0 mg KOH/gm, commercially available from BASF AG of Ludwigshafen, Germany.

Polyol 7 is a glycerine initiated polyether polyol having a terminal ethylene oxide cap of about 14 wt % ethylene oxide, a nominal functionality of 3, and a hydroxyl number of about 28.0 mg KOH/gm, commercially available from BASF AG of Ludwigshafen, Germany.

Polyol 8 is a graft polyol having about 45% SAN solids, a nominal functionality of 3, and a hydroxyl number of from 23 to 26 mg KOH/gm, commercially available from BASF AG of Ludwigshafen, Germany.

Polyol 9 is an ethylene oxide rich cell opening polyol, commercially available from Dow Chemical Company of Midland, Mich.

Polyol 10 is 1,4-butanediol, commercially available from BASF Corporation of Florham Park, N.J.

Catalyst 5 comprises about 33 wt % 1,4-diazabicyclooctane and about 67 wt % dipropylene glycol, commercially available from BASF Corporation of Florham Park, N.J.

Catalyst 6 comprises dimethylaminoethoxyethanol (DMEE), commercially available from BASF Corporation of Florham Park, N.J.

Catalyst 7 comprises N,N-dimethylethanolamine S (DMEA), commercially available from BASF Corporation of Florham Park, N.J.

Isocyanate 2 is an isocyanate-terminated prepolymer comprising:
1) about wt % of 4,4'-diphenylmethane diisocyanate having a functionality of about 2 and an NCO content of about 33.5 wt %;
2) about 11.90 wt % of a mixture of about 50 wt % of 2,4'-diphenylmethane diisocyanate and about 50 wt % of 4,4'-diphenylmethane diisocyanate, the mixture having a functionality of about 2 and an NCO content of about 33.5 wt %;
3) about 54.50 wt % of a polymethylene polyphenylpolyisocyanate having a functionality of about 2.7 and an NCO content of about 31.5 wt %; and
4) about 9.10 wt % of Polyol 6;
all commercially available from BASF AG of Ludwigshafen, Germany.

Isocyanate 3 is an isocyanate-terminated prepolymer comprising:
1) about 39.76 wt % of a pure 4,4'-diphenylmethane diisocyanate;
2) about 31.62 wt % of a mixture of about 50 wt % of 2,4'-diphenylmethane diisocyanate and about 50 wt % of 4,4'-diphenylmethane diisocyanate, the mixture having a functionality of about 2 and an NCO content of about 33.5 wt %;
3) about 9.00 wt % of a polymethylene polyphenylpolyisocyanate having a functionality of about 2.7 and an NCO content of about 31.5 wt %; and
4) about 19.62 wt % of Polyol 6;
all commercially available from BASF AG of Ludwigshafen, Germany.

Figure 4:
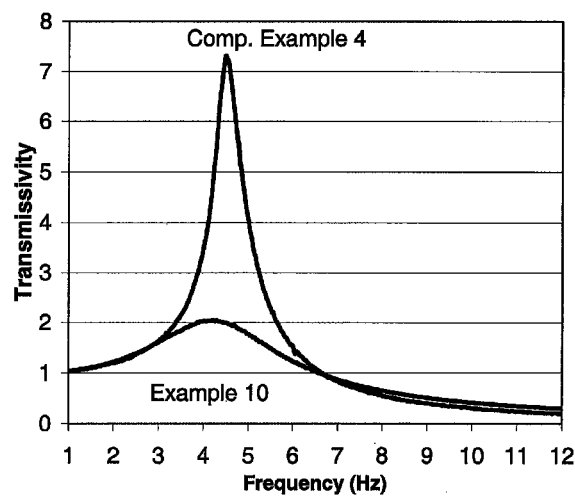
FIG. 4 is a line graph illustrating vibration transmissivity as a function of a change in frequency of Comp. Example 3 and Example 10 of the present invention.

Various physical properties of the polyurethane articles are tested and illustrated in Table 6 below. Vibration transmissivity testing is conducted on the polyurethane articles. A vibration table including upper and lower plates, a mass, and a servo-hydraulic apparatus is used to test the polyurethane articles. A 100×100×50 mm sample of the polyurethane article is placed between the upper and lower plates, with the plates completely overlapping the sample. The plates are constructed according to ISO 3386-1. The lower plate is perforated with 6 mm diameter holes spaced 20 mm apart. A frictionless bearing is placed on top of the upper plate. An 8 mm diameter guiding rod is passed through the frictionless bearing, through the center of the upper plate, and through a hole bored through the center of the sample. The mass is placed over the upper plate and guiding rod, and allowed to rest for 30 minutes. The guiding rod restricts the movement of the mass and the sample to a single axis. The table is accelerated by the servo-hydraulic apparatus generating sinusoidal displacement with an amplitude of 0.25 mm. Frequency is continuously increased from 1 to 21 Hz within 600 seconds, specifically at a rate of 2 Hz per minute. Displacement of both the mass and the table is measured by a high resolution laser extensometer. Through addition of weights, the mass is adjusted to a compression stress value of the sample at 40% deflection, which is previously measured for the sample (according to ISO 3386-1). The transmissivity, calculated as the ratio of the displacement amplitudes at the upper and the lower plates, is plotted against frequency, as illustrated in FIG. 4 for Comp. Example 4 and Example 10.

Figure 5:
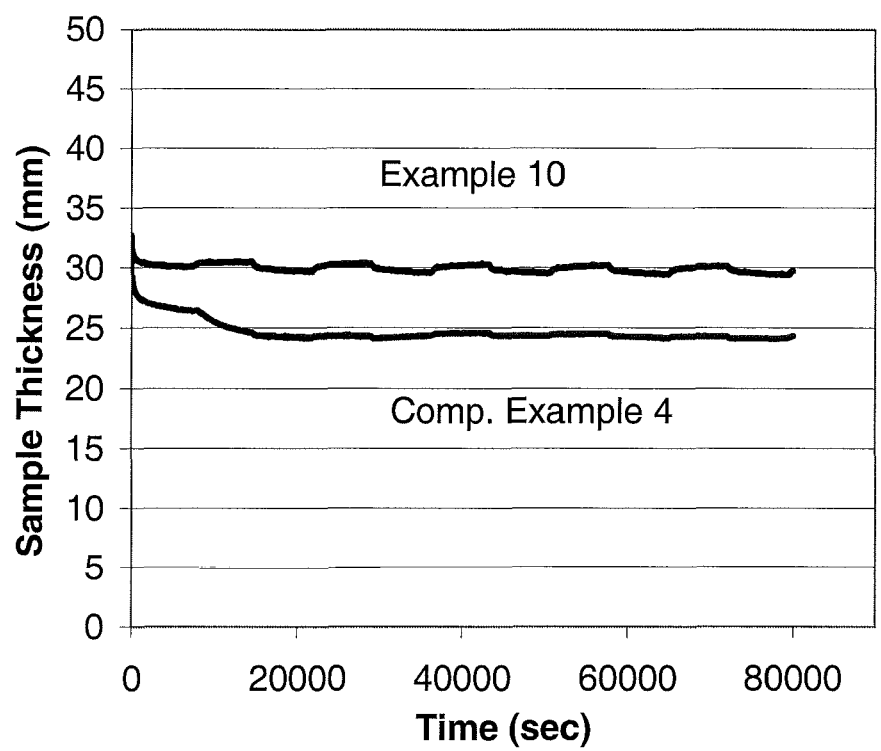
FIG. 5 is a line graph illustrating dynamic creep, specifically a change in thickness as a function of a change in time of Comp. Example 3 and Example 10 of the present invention.

Loss of thickness under dynamic condition testing is conducted on the polyurethane articles. A 100×100×50 mm sample of the polyurethane article is placed between the upper and lower plates, with the plates completely overlapping the sample, as described above. The sample is compressed four times/cycles to 70% deflection at a rate of 100 mm per minute. Upon reaching 45% deflection in the fourth cycle, the initial static force required to achieve this deflection is recorded. Following completion of the fourth cycle, the initial static force is maintained through continuous adjustment of displacement, and a sinusoidal displacement of 1 Hz frequency and 0.25 mm amplitude is superimposed using the servo-hydraulic apparatus. Air temperature is maintained at 40° C., and the relative humidity is changed every two hours, alternating between an initial relative humidity of 25% and 80%. The duration of the measurement is 80,000 cycles. Thickness of the sample is recorded as a function of time, as illustrated in FIG. 4 for Comp. Example 4 and Example 10. Referring to FIGS. 4 and 5, Example 10 shows dramatic improvement relative to Comp. Example 4.

TABLE 6

| Mechanical Properties | Example | |
|---|---|---|
| | Comp. 4 | 10 |
| Core Density (lbs/ft$^3$) | 5.38 | 5.92 |
| Density (lbs/ft$^3$) | 5.41 | 5.93 |
| CLD (40%) (kPa) | 11.5 | 10 |
| Hysterisis (%) | 14.3 | 11.8 |
| Break Elongation (%) | 84 | 116 |
| Tensile Strength (kPa) | 165 | 148 |
| Shear Strength (BMW-Norm) (N/mm) | 1.9 | 2.3 |
| Compression Set (BMW-Norm) (%) | 2.6 | 1.9 |
| Wet Compression Set (%) | 6.6 | −2.5 |
| Resilience (pendulum) (%) | 72 | 35 |
| Resilience (ball) (%) | 67 | 32 |

Four resin compositions, specifically Resins A-D, of the present invention are prepared. The resin compositions are made like the resin compositions described above with Examples 1-6. Phase separation of the resin compositions is a possible concern. Therefore, Resins A and B are mixed and stored in quart glass jars at ambient temperature. After two months, no phase separation is observed for either resin. The viscosity of Resin A is 1373 cP, and the viscosity of Resin B is 2160 cP, both measured at 23° C. The amount and type of each component used to form the resin compositions is indicated in Table 7 below with all values in parts by weight based on 100 parts by weight of resin composition unless otherwise indicated.

TABLE 7

| Component | Resin | | | |
|---|---|---|---|---|
| | A | B | C | D |
| Polyol 2 | 77.00 | 68.00 | 68.00 | 68.00 |
| Polyol 3 | 18.00 | 27.00 | 27.00 | 27.00 |
| Catalyst 3 | 0.15 | 0.15 | 0.15 | 0.15 |
| Catalyst 4 | 0.60 | 0.60 | 0.60 | 0.60 |
| Surfactant 2 | 0.70 | — | — | — |
| Surfactant 3 | — | 1.00 | 1.50 | 1.50 |
| Water | 1.65 | 1.65 | 1.40 | 1.65 |

One additional example, specifically Example 11, of the polyurethane article of the present invention is prepared. In addition, two control polyurethane articles are prepared, specifically Comp. Examples 5 and 6, for comparison with Example 11. Blocks of the polyurethane articles are prepared as described above with Examples 1-6. The amount and type of each component used to form the polyurethane articles is indicated in Table 8 below with all values in parts by weight based on 100 parts by weight of all of the components prior to reaction to make the polyurethane article unless otherwise indicated.

TABLE 8

| Component | Example | | |
|---|---|---|---|
| | Comp. 5 | Comp. 6 | 11 |
| Polyol 2 | — | — | 68.00 |
| Polyol 3 | — | — | 27.00 |
| Polyol 11 | 65.5 | 65.5 | — |
| Polyol 12 | 34.5 | 34.5 | — |
| Catalyst 3 | 0.32 | 0.32 | 1.00 |
| Catalyst 5 | 0.08 | 0.08 | 0.10 |
| Catalyst 8 | 1.40 | 1.40 | — |
| Surfactant 2 | — | — | 1.10 |
| Surfactant 4 | 1.00 | 1.00 | — |

TABLE 8-continued

| Component | Example | | |
|---|---|---|---|
| | Comp. 5 | Comp. 6 | 11 |
| Water | 1.20 | 1.20 | 1.10 |
| Isocyanate 4 | 19.4 | 21.5 | 19.2 |
| Isocyanate Index | 90 | 100 | 110 |

Polyol 11 is glycerol/sorbitol co-initiated polyol having a terminal ethylene oxide cap of about 20 wt %, a nominal functionality of 2.9, and a hydroxyl number of 31 mg KOH/gm, commercially available from BASF Corporation of Florham Park, N.J.

Polyol 12 is a graft polyol having about 43% SAN solids, a nominal functionality of 3, a hydroxyl number of 19.8 mg KOH/gm, and a carrier polyol portion having a terminal ethylene oxide cap of about 19 wt %, commercially available from BASF Corporation of Florham Park, N.J.

Catalyst 8 is a blend comprising about 85 wt % diethanolamine (DEOA) and about 15 wt % water, commercially available from Air Products and Chemicals of Allentown, Pa.

Surfactant 4 is a polyalkyleneoxymethyl silicone surfactant, commercially available from Dow Corning Corporation of Midland, Mich.

Isocyanate 4 is a mixture of about 80 wt % 2,4'-toluene diisocyanate and about 20 wt % 2,6'-toluene diisocyanate, commercially available from BASF Corporation of Florham Park, N.J.

Various physical properties of the polyurethane articles are tested as described above with Examples 1-6 and illustrated in Table 9 below. Example 11 has a peak transmissivity lower than both Comp. Examples 5 and 6.

TABLE 9

| | Comp. 5 | Comp. 6 | 11 |
|---|---|---|---|
| Mechanical Properties | | | |
| Core Density (lbs/ft$^3$) | 4.81 | 4.86 | 4.75 |
| Original 25% IFD (lbf) | 58.14 | 77.65 | 64.38 |
| Original 25% R IFD (lbf) | 51.30 | 68.53 | 57.33 |
| Original 65% IFD (lbf) | 165.18 | 215.70 | 153.64 |
| SAG Factor | 2.84 | 2.78 | 2.39 |
| Hysteresis (%) | 19.40 | 19.50 | 17.00 |
| Air Flow (cfm) | 0.72 | 1.10 | 0.59 |
| Block Tear (ppi) | 1.13 | 1.10 | 0.82 |
| Elongation (%) | 104.03 | 80.60 | 68.93 |
| Tensile Strength (%) | 20.61 | 19.68 | 10.77 |
| Original 50% CFD (psi) | 1.39 | 1.81 | 1.19 |
| 50% CFD Humid Aged (3 hrs. 105° C., 95% RH), % of Original (psi) | 74.51 | 69.02 | 64.36 |
| Comp Set 50% Ambient (%) | 2.98 | 1.50 | 1.44 |
| Comp Set 50% Humid Aged (3 hrs. 105° C., 95% RH) (%) | 4.35 | 3.69 | 2.78 |
| Resilience (%) | 66 | 70 | 64 |
| Vibration Transmissivity | | | |
| Resonance Frequency (Hz) | 7.74 | 7.42 | 6.18 |
| Peak Transmissivity | 3.37 | 3.03 | 1.95 |
| DMA | | | |
| Peak Tan Delta | 1.06 | 0.95 | 0.60 |
| Tg (° C.) | −46.91 | −46.60 | −32.96 |

The present invention has been described herein in an illustrative manner, and it is to be understood that the terminology which has been used is intended to be in the nature of words of description rather than of limitation.

Obviously, many modifications and variations of the present invention are possible in light of the above teachings. The invention may be practiced otherwise than as specifically described within the scope of the appended claims.

What is claimed is:

1. A polyurethane article comprising the reaction product of:
   (I) a resin composition consisting of
      (A) a hydrophilic polyol containing alkylene oxides and having
         (i) a nominal functionality of from 2 to 6,
         (ii) a hydroxyl number of from 20 to 100 mg KOH/g, and
         (iii) at least 70 parts by weight ethylene oxide based on 100 parts by weight of said alkylene oxides, and
      (B) a hydrophobic polyol consisting of a polymer polyol, said polymer polyol consisting of a carrier polyol and a filler component, said carrier polyol containing alkylene oxides and having,
         (i) a terminal cap of from about 5 to about 20 parts by weight ethylene oxide based on 100 parts by weight of said alkylene oxides,
         (ii) a nominal functionality of from 2 to 6,
         (iii) a hydroxyl number of from 20 to 80 mg KOH/g, and
         (iv) at least 80 parts by weight propylene oxide based on 100 parts by weight of said alkylene oxides,
         wherein said filler component is present in said hydrophobic polyol (B) in an amount of from about 20 to about 35 parts by weight based on 100 parts by weight of said hydrophobic polyol (B) and comprises styrene-acrylonitrile copolymer (SAN); and
   (II) an isocyanate component selected from the group of diphenylmethane diisocyanates, polymeric diphenylmethane diisocyanates, and combinations thereof; in the presence of
   (III) a blowing agent component;
   wherein said hydrophilic polyol (A) and said hydrophobic polyol (B) are present in a weight ratio (A:B) of from 1.5:1 to 10:1 prior to reaction to make said polyurethane article; and wherein said polyurethane article has a 25% IFD hardness of from about 40 to about 80 pound force according to ASTM D 3574, a peak vibration transmissivity less than 3, and a density of from about 3 to about 7 pounds per cubic foot according to ASTM D 3574.

2. A polyurethane article as set forth in claim 1 wherein said hydrophilic polyol (A) and said hydrophobic polyol (B) are present in said resin composition (I) in a combined amount of from about 85 to about 97 parts by weight based on 100 parts by weight of said resin composition, and said resin composition (I) and said isocyanate component (II) are reacted in an amount to have an isocyanate index of from about 95 to about 115.

3. A polyurethane article comprising the reaction product of:
   (I) a resin composition consisting of
      (A) a hydrophilic polyol containing alkylene oxides and having
         (i) a nominal functionality of 3,
         (ii) a hydroxyl number of from 44 to 47 mg KOH/g,
         (iii) about 75 parts by weight ethylene oxide based on 100 parts by weight of said alkylene oxides, and
         (iv) a number-average molecular weight of about 3650, and
      (B) a hydrophobic polyol consisting of a polymer polyol, said polymer polyol consisting of a carrier polyol and a filler component, said carrier polyol containing alkylene oxides and having,
         (i) a terminal cap of about 13 parts by weight ethylene oxide based on 100 parts by weight of said alkylene oxides,
         (ii) a nominal functionality of 3,
         (iii) a hydroxyl number of from 23 to 26 mg KOH/g,
         (iv) at least 80 parts by weight propylene oxide based on 100 parts by weight of said alkylene oxides, and
         (v) a number-average molecular weight of about 4800,
         wherein said filler component is present in said hydrophobic polyol (B) in an amount of from about 32 parts by weight based on 100 parts by weight of said hydrophobic polyol (B) and comprises styrene-acrylonitrile copolymer (SAN); and
   (II) an isocyanate component selected from the group consisting of diphenylmethane diisocyanates, polymeric diphenylmethane diisocyanates, and combinations thereof; in the presence of
   (III) a blowing agent component, and
   (IV) an additive component comprising an amine blowing catalyst, a gelling catalyst, and a surfactant;
   wherein said hydrophilic polyol (A) and said hydrophobic polyol (B) are present in a weight ratio (A:B) of from about 2.5:1 prior to reaction to make said polyurethane article; and wherein said polyurethane article has a 25% IFD hardness of about 65 pound force according to ASTM D 3574, a peak vibration transmissivity less than 3, and a density of from about 4 to about 6 pounds per cubic foot according to ASTM D 3574.

4. A polyurethane article consisting of the reaction product of:
   (I) a resin composition consisting of
      (A) a hydrophilic polyol containing alkylene oxides and having
         (i) a nominal functionality of from 2 to 4,
         (ii) a hydroxyl number of from 25 to 55 mg KOH/g,
         (iii) at least 70 parts by weight ethylene oxide based on 100 parts by weight of said alkylene oxides, and
         (iv) a number-average molecular weight of from 3150 to 4150, and
      (B) a hydrophobic polyol consisting of a polymer polyol, said polymer polyol consisting of a carrier polyol and a filler component, said carrier polyol containing alkylene oxides and having,
         (i) a terminal cap of from about 10 to about 15 parts by weight ethylene oxide based on 100 parts by weight of said alkylene oxides,
         (ii) a nominal functionality of from 2 to 4,
         (iii) a hydroxyl number of from 20 to 60 mg KOH/g,
         (iv) at least 80 parts by weight propylene oxide based on 100 parts by weight of said alkylene oxides, and
         (v) a number-average molecular weight of from 4300 to 5300, wherein said filler component is present in said hydrophobic polyol (B) in an amount of from about 20 to about 35 parts by weight based on 100 parts by weight of said hydrophobic polyol (B) and comprises styrene-acrylonitrile copolymer (SAN); and (II) an isocyanate component selected from the group consisting of diphenylmethane diisocyanates, polymeric diphenylmethane diisocyanates, and combinations thereof; in the presence of (III) a blowing agent component, and (IV) an additive component consisting of a gelling catalyst, an amine blowing catalyst and a surfactant;

wherein said hydrophilic polyol (A) and said hydrophobic polyol (B) are present in a weight ratio (A:B) of from 1.5:1 to 6:1 prior to reaction to make said polyurethane article; and wherein said polyurethane article has a 25% IFD hardness of from about 50 to about 80 pound force according to ASTM D 3574, a peak vibration transmissivity less than 3, and a density of from about 4 to about 6 pounds per cubic foot according to ASTM D 3574.

5. The polyurethane article set forth in claim 4, wherein the hydrophilic polyol (A) is a glycerine-initiated polyether polyol, the hydrophobic polyol (B) is a styrene-acrylonitrile graft polyol, and the blowing agent component (III) is hydrofluorocarbon.

\* \* \* \* \*